May 1, 1956 W. LAPPE 2,743,967
MACHINE TOOL WEAR COMPENSATING APPARATUS
Filed June 10, 1953 3 Sheets-Sheet 1

Inventor:
WILHELM LAPPE
BY:

May 1, 1956 W. LAPPE 2,743,967
MACHINE TOOL WEAR COMPENSATING APPARATUS
Filed June 10, 1953 3 Sheets-Sheet 3

Inventor:
WILHELM LAPPE
BY

United States Patent Office 2,743,967
Patented May 1, 1956

2,743,967

MACHINE TOOL WEAR COMPENSATING APPARATUS

Wilhelm Lappe, Berlin-Britz, Germany, assignor to Firma Fritz Werner Aktiengesellschaft, Berlin-Marienfelde, Germany Application June 10, 1953, Serial No. 360,652

Claims priority, application Germany June 27, 1952

14 Claims. (Cl. 308—3)

The present invention relates to devices such as machine tools, and in particular to an apparatus for eliminating play between moving parts of such a device which are in sliding engagement with each other.

Many attempts have been made to eliminate play between such parts as the carriage of a machine tool and the guides along which such a carriage slides. The accuracy of the machine tool is diminished when the play at the carriage guides becomes too great. Most known adjusting means for eliminating such play include parts such as wedge members which are pressed against the carriage guide, but these wedge members are very often tilted or non-uniformly positioned so that they have a substantially point or line contact with the carriage guides which results in a tendency to tip the carriage and in rapid wear of the carriage guides as well as the wedge members and a relatively rapid return of undesirable play. Where guide extensions are removably connected to a carriage it is possible to scrape or otherwise machine the surfaces which slidably engage each other, but such a process requires a great amount of time and labor and keeps the machine idle for an undesirable period of time.

One of the objects of the present invention is to overcome the above drawbacks by providing a means for quickly and easily eliminating play between such parts as the carriage of a machine tool and the guides therefor.

A further object of the present invention is to provide a play eliminating adjusting means which includes contact members for slidably engaging the guides and a structure for moving the contact members without tilting thereof into uniform sliding contact with the guides.

Another object of the present invention is to provide separate guide extensions for a carriage and to connect the separate extensions to the carriage in such a way that the extensions are capable of bearing great loads at the parts thereof connected to the carriage.

With the above objects in view, the present invention mainly consists of a machine tool which includes a support having a guiding face and a pair of projecting guides extending along opposite side edges of the guiding face and including these side edges thereof. A carriage slidably engages this guiding face and has a pair of opposite side extensions respectively extending about the projecting guides of the support, each extension having an inner face directed toward the guiding face and spaced from the projecting guide about which the extension is located. A pair of elongated contact members are respectively located between the inner faces of these extensions and the projecting guides of the support and are in slidable engagement with these projecting guides, and a pair of adjusting means are respectively located between the contact members and the inner faces of the extensions to provide a uniform sliding contact between the projecting guides of the support and the contact members so as to eliminate play between the support and carriage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
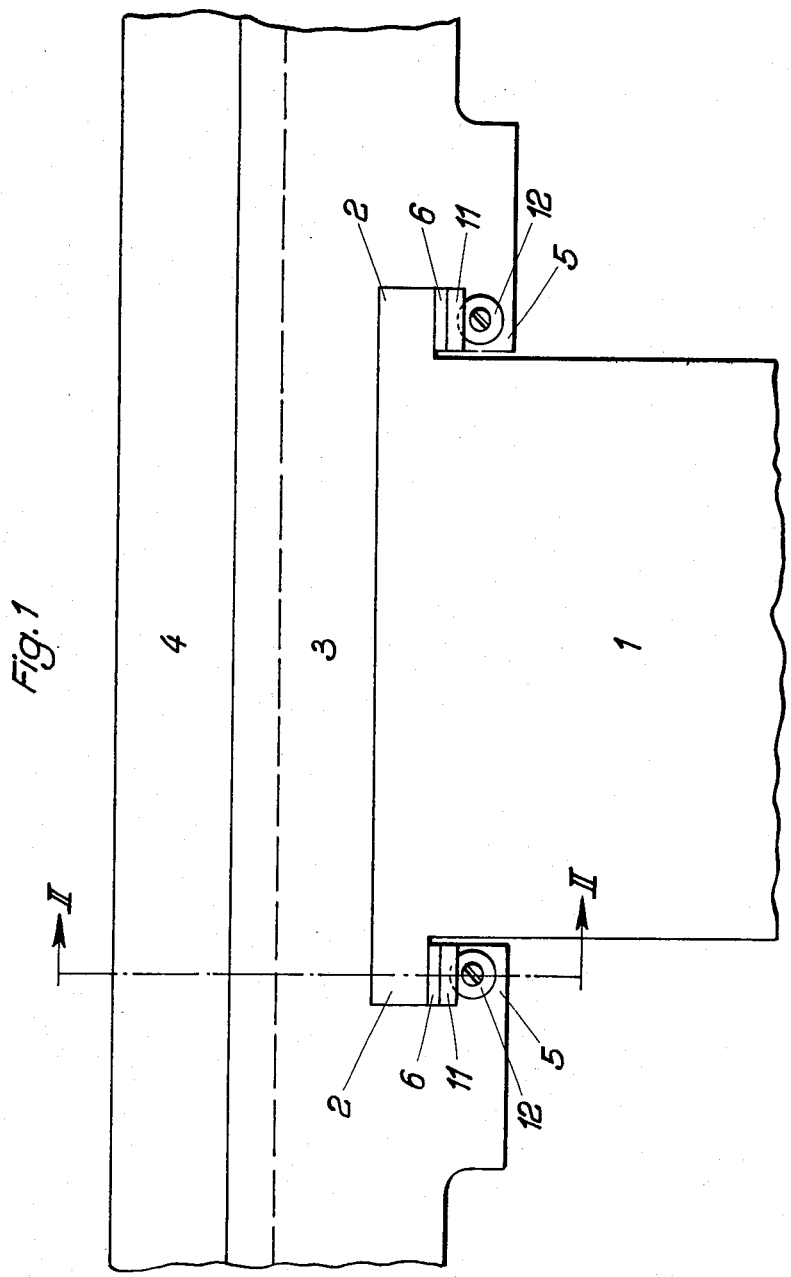
Fig. 1 is a fragmentary elevational view of one embodiment of the present invention.
Figure 2:
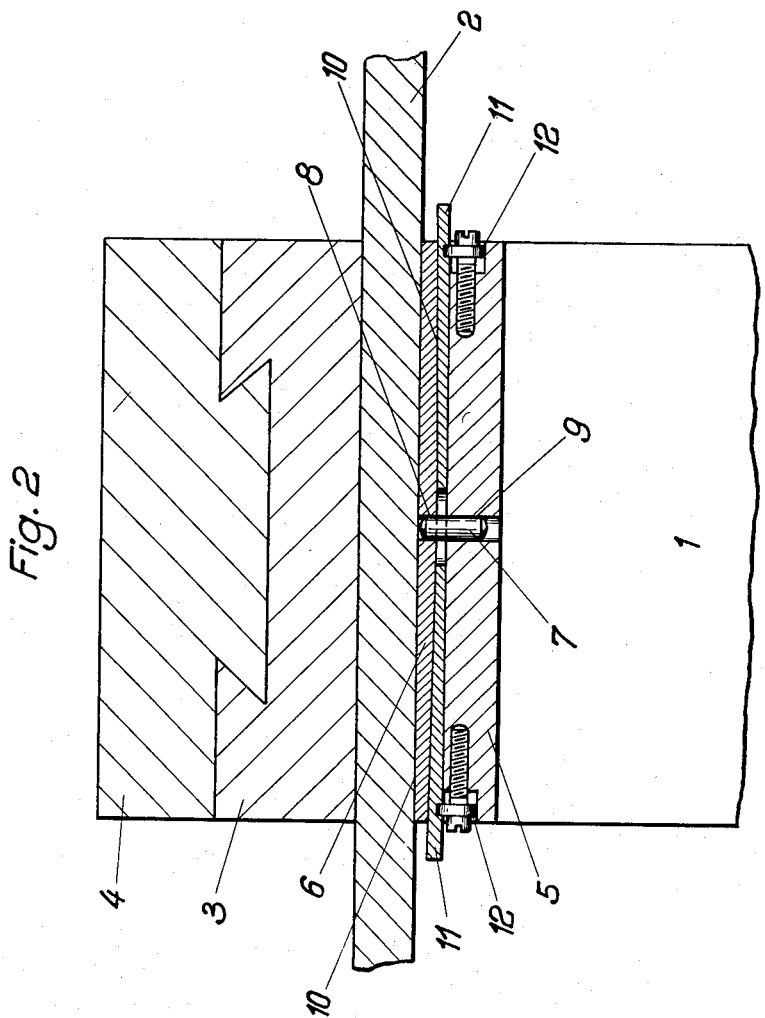
Fig. 2 is a sectional view taken along line II—II of Fig. 1 in the direction of the arrows.

Referring now to the drawings, and in particular to Figs. 1 and 2, it will be seen that the structure of the invention includes a support 1, of a machine tool or the like, having a top guiding face and opposite sides which are undercut adjacent to this guiding face to provide opposite projecting guides 2 extending along the side edges of the top guiding face of support 1 and including these side edges. A carriage 3 slidably engages the top guiding face of support 1 for movement along this guiding face and has a pair of integral extensions 5 respectively located about the projecting guides 2 and having inner faces directed upwardly toward the top guiding face of support 1 and being spaced from the guides 2. A work or tool carrying carriage 4 is mounted on the carriage 3 for movement with respect to the latter in a direction perpendicular to the direction of movement of carriage 3 on support 1, in a manner well known in the art.

A pair of elongated contact members 6 are respectively located between the inner faces of extensions 5 and the projecting guides 2 and are in slidable engagement with the latter, and wedge members 11 and screw members 12 form an adjusting means for regulating the sliding contact between members 6 and guides 2. As is most clearly shown in Fig. 2, each elongated contact member 6 is thickest at its central portion and tapers toward its opposite ends at its face distant from guide 2 to provide each contact member 6 with oppositely inclined face portions 10. At its central thickest portion each contact member 6 is formed with a bore 8 extending normal to the guide face of support 1 and each extension 5 is formed with a bore 9 into which a pin 7 is inserted with a press fit, this pin 7 extending slidably into the bore 8 so that in this way the contact members 6 are free to move toward and away from the guides 2 but are prevented from shifting longitudinally with respect to the extensions 5.

A wedge member 11 is located in engagement with each inclined face portion 10 and the inner face of one of the extensions 5, and each wedge member 11 is formed with a transverse groove into which an annular flange, fixed to each screw 12, slidably extends, these screws 12 being threadedly connected to the extensions 5 and being substantially parallel to the wedge members 11, as is shown in Fig. 2. Thus, upon turning of the screw members 12, the contact members 6 may be quickly and easily adjusted to eliminate play between the guides 2 and carriage 3, and the arrangement of a pair of wedge members at opposite sides of the central part of each contact member 6 allows this contact member 6 to be uniformly moved along its entire length toward and away from the guides 2 so that tilting of these contact members 6 and non-uniform engagement between the same and guides 2 are avoided.

Figure 3:
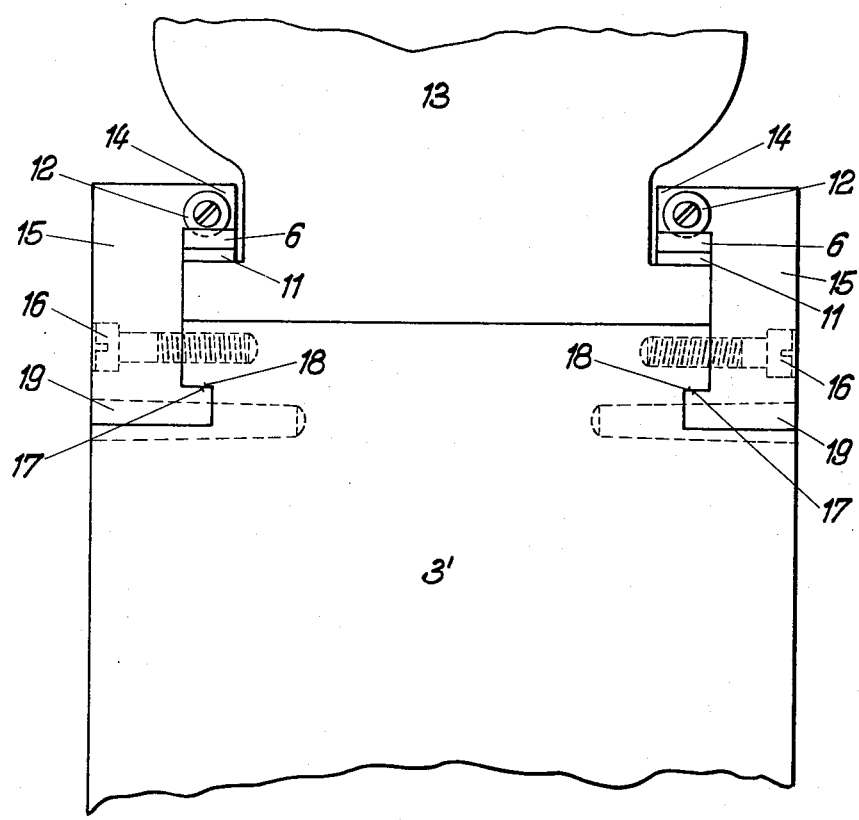
Fig. 3 is a fragmentary top plan view of a different embodiment of the present invention.

In the embodiment of the invention shown in Figs. 1 and 2, the extensions 5 are integral with the carriage 3. However, it is possible for extensions of this type to be separate from the carriage and fixed thereto, and such an arrangement is illustrated in Fig. 3 which shows in top plan view a support 13 which guides the carriage 3' for vertical movement. This carriage 3' slidably engages the vertical guiding face of the support 13 and is formed with a pair of grooves each of which has an inner face 18 substantially parallel to the guiding face of support 13. A pair of substantially U-shaped extensions 15 have first free end portions 17 respectively located in and filling the grooves of the carriage 3' so as to abut against the faces 18 of these grooves, and these extensions 15 have second free end portions 14 respectively extending about the opposite projecting guides of support 13 and having inner faces directed toward the guiding face of support 13 and being spaced from the projecting guides thereof. Contact members and an adjusting means therefor identical with those shown and described in connection with Figs. 1 and 2 are located between the projecting guides of support 13 and the free end portions 14 of the extensions 15 so as to eliminate play between the carriage 3' and support 13 in the same way that the above-described structure eliminates play between the carriage 3 and support 1.

Dowel pins 19 are mounted on the carriage 3' and engage the extensions 15 to urge the latter against the faces 18 of the grooves of carriage 3', and screw members 16 pass through bores of the extensions 15 and threadedly engage the carriage 3' to fix the extensions 15 thereto. It will be noted that the faces 18 as well as the screw members 16 are located in planes parallel to the guiding face of support 13 and moreover that the screw members 16 extend in a direction perpendicular to the projecting guides of support 13 so that these screw members 16 and the contact between the extensions 15 and faces 18 of carriage 3' provide an extremely strong structure for withstanding stresses to which the carriage 3' is subjected, these stresses tending to act in a direction substantially perpendicular to the faces 18 and screw members 16.

Although the above-described structure of the invention relates only to flat guiding surfaces, it is to be understood that the principle of the present invention is equally applicable to prismatic guides.

It will be understood that each of the elements described above, or two or more together, may also find a useful application in other types of machine tool guides differing from the types described above.

While the invention has been illustrated and described as embodied in apparatus for eliminating play in machine tool guides, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter; and a pair of wedge members located between and engaging said inner face of each extension and each contact member respectively to provide a uniform sliding contact between said projecting guides and contact members so as to eliminate play between said support and carriage.

2. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter, each of said contact members being formed with an elongated bore extending in a direction substantially normal to said guiding face of said support; a pair of wedge members located between and engaging said inner face of each extension and each contact member respectively to provide a uniform sliding contact between said projecting guides and contact members so as to eliminate play between said support and carriage; and a pair of pins respectively fixed to said extensions of said carriage and respectively extending slidably into said bores of said contact members to prevent shifting of said contact members with respect to said extensions along said projecting guides while freeing said contact members for movement toward and away from said projecting guides.

3. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter, each of said contact members being thickest at its central portion and tapering toward its opposite ends at its face distant from said guiding face to provide each contact member with a pair of oppositely inclined face portions directed toward the inner face of the extension at which said contact member is located; a pair of wedge members located between and engaging said inner face of each extension and said oppositely inclined face portions, respectively, of each contact member; and a plurality of adjusting means operatively connected to said wedge members, respectively, for moving the same toward and away from said central thickest portions of said contact members so as to adjust the sliding contact between said contact members and projecting guides for eliminating play between said support and carriage.

4. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter, each of said contact members being thickest at its central portion and tapering toward its opposite ends at its face distant from said guiding face to provide each contact member with a pair of oppositely inclined face portions directed toward the inner face of the extension at which said contact member is located, each contact member being formed in said central portion thereof with an elongated bore extending in a direction substantially normal to said guiding face of said support; a pair of pins respectively fixed to said extensions of said carriage and respectively extending slidably into said bores of said contact members to prevent shifting of said contact members with respect to said extensions along said projecting guides while freeing said contact members for movement toward and away from said projecting guides; a pair of wedge members located between and engaging said inner face of each extension and said oppositely inclined face portions, respectively, of each contact member; and a plurality of adjusting means operatively connected to said wedge members, respectively, for moving the same toward and away from said central thickest portions of said contact members so as to adjust the sliding contact between said contact members and projecting guides for eliminating play between said support and carriage.

5. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter, each of said contact members being thickest at its central portion and tapering toward its opposite ends at its face distant from said guiding face to provide each contact member with a pair of oppositely inclined face portions directed toward the inner face of the extension at which said contact member is located, each contact member being formed in said central portion thereof with an elongated bore extending in a direction substantially normal to said guiding face of said support; a pair of pins respectively fixed to said extensions of said carriage and respectively extending slidably into said bores of said contact members to prevent shifting of said contact members with respect to said extensions along said projecting guides while freeing said contact members for movement toward and away from said projecting guides; a pair of wedge members located between and engaging said inner face of each extension and said oppositely inclined face portions, respectively, of each contact member; and a plurality of adjusting means operatively connected to said wedge members, respectively, for moving the same toward and away from said central thickest portions of said contact members so as to adjust the sliding contact between said contact members and projecting guides for eliminating play between said support and carriage, said plurality of adjusting means comprising two pairs of screws members threadedly engaging said extensions, respectively, and being respectively connected to said wedge members for shifting the same upon turning movement of said screw members with respect to said extensions.

6. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter, each of said contact members being thickest at its central portion and tapering toward its opposite ends at its face distant from said guiding face to provide each contact member with a pair of oppositely inclined face portions directed toward the inner face of the extension at which said contact member is located; a pair of wedge members located between and engaging said inner face of each extension and said oppositely inclined face portions, respectively, of each contact member, each wedge member being formed in its face contacting said extension with a groove extending transversely to the length of said wedge member; and two pairs of screw members threadedly engaging said extensions, respectively, being substantially parallel to said wedge members, and respectively having annular flange portions respectively located in said grooves of said wedge members so that said wedge members are longitudinally shifted upon turning of said screw members.

7. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter, each of said contact members being thickest at its central portion and tapering toward its opposite ends at its face distant from said guiding face to provide each contact member with a pair of oppositely inclined face portions directed toward the inner face of the extension at which said contact member is located, each contact member being formed in said central portion thereof with an elongated bore extending in a direction substantially normal to said guiding face of said support; a pair of pins respectively fixed to said extensions of said carriage and respectively extending slidably into said bores of said contact members to prevent shifting of said contact members with respect to said extensions along said projecting guides while freeing said contact members for movement toward and away from said projecting guides; a pair of wedge members located between and engaging said inner face of each extension and said oppositely inclined face portions, respectively, of each contact member, each wedge member being formed in its face contacting said extension with a groove extending transversely to the length of said wedge member; and two pairs of screw members threadedly engaging said extensions, respectively, being substantially parallel to said wedge members, and respectively having annular flange portions respectively located in said grooves of said wedge members so that said wedge members are longitudinally shifted upon turning of said screw members.

8. In a machine tool, in combination, a support having a guiding face and a pair of projecting guides extending along opposite side edges of said guiding face and including said side edges; a carriage slidably engaging said guiding face of said support and having a pair of opposite integral side extensions respectively extending about said projecting guides of said support, each extension having an inner face directed toward said guiding face and spaced from the projecting guide about which said extension is located; a pair of elongated contact members respectively located between said inner faces of said extensions and said projecting guides and slidably engaging the latter; and a pair of wedge members located between and engaging said inner face of each extension and each contact member respectively to provide a uniform sliding contact between said projecting guides and contact members so as to eliminate play between said support and carriage.

9. In a machine tool, in combination, a support having a guiding face and a pair of projecting guides extending along opposite side edges of said guiding face and including said side edges; a carriage slidably engaging said guiding face of said support and having a pair of opposite side extensions respectively extending about said projecting guides of said support, each extension having an inner face directed toward said guiding face and spaced from the projecting guide about which said extension is located, said extensions being separate from said carriage and being fixed thereto by screw members located in a plane substantially parallel to said guiding face and extending in a direction substantially perpendicular to the length of said projecting guides; a pair of elongated contact members respectively located between said inner faces of said extensions and said projecting guides and slidably engaging the latter; and a pair of wedge members located between and engaging said inner face of each extension and each contact member respectively to provide a uniform sliding contact between said projecting guides and contact members so as to eliminate play between said support and carriage.

10. In a machine tool, in combination, a support having a guiding face and a pair of projecting guides extending along opposite side edges of said guiding face and including said side edges; a carriage slidably engaging said guiding face of said support and being formed at opposite sides thereof with a pair of elongated grooves substantially parallel to projecting guides and each having nearest to said guiding face, an inner surface substantially parallel thereto; a pair of substantially U-shaped extensions having first free end portion respectively located in and filling said grooves and second free end portions extending about said projecting guides and each having an inner face directed toward said guiding face and spaced from the projecting guide about which said extension is located; a pair of elongated contact members respectively located between said inner faces of said extensions and said projecting guides and slidably engaging the latter; and a pair of wedge members located between and engaging said inner face of each extension and each contact member respectively to provide a uniform sliding contact between said projecting guides and contact members so as to eliminate play between said support and carriage.

11. In a machine tool, in combination, a support having a guiding face and a pair of projecting guides extending along opposite side edges of said guiding face and including said side edges; a carriage slidably engaging said guiding face of said support and being formed at opposite sides thereof with a pair of elongated grooves substantially parallel to projecting guides and each having, nearest to said guiding face, an inner surface substantially parallel thereto; a pair of substantially U-shaped extensions having first free end portions respectively located in and filling said grooves and second free end portions extending about said projecting guides and each having an inner face directed toward said guiding face and spaced from the projecting guide about which said extension is located; a pair of elongated contact members respectively located between said inner faces of said extensions and said projecting guides and slidably engaging the latter; a pair of adjusting means respectively located between said contact members and said inner faces of said extensions to provide a uniform sliding contact between said projecting guides and contact members so as to eliminate play between said support and carriage; and a plurality of screw members fixing said extensions to said carriage, said screw members extending transversely to the length of said projecting guides.

12. In a machine tool, in combination, a support having a guiding face and a pair of projecting grooves extending along opposite side edges of said guiding face and including said side edges; a carriage slidably engaging said guiding face of said support and being formed at opposite sides thereof with a pair of elongated grooves substantially parallel to projecting guides and each having, nearest to said guiding face, an inner surface substantially parallel thereto; a pair of substantially U-shaped extensions having first free end portions respectively located in and filling said grooves and second free end portions extending about said projecting guides and each having an inner face directed toward said guiding face and spaced from the projecting guide about which said extension is located; a pair of elongated contact members respectively located between said inner faces of said extensions and said projecting guides and slidably engaging the latter; a pair of wedge members located between and engaging said inner face of each extension and each contact member respectively to provide a uniform sliding contact between said projecting guides and contact members so as to eliminate play between said support and carriage; and a plurality of dowel pins mounted on said carriage and engaging said extensions to urge the latter against said inner surfaces of said grooves of said carriage, respectively.

13. In a machine tool, in combination, a support having a guiding face and a pair of projecting guides extending along opposite side edges of said guiding face and including said side edges; a carriage slidably engaging said guiding face of said support and being formed at opposite sides thereof with a pair of elongated grooves substantially parallel to projecting guides and each having, nearest to said guiding face, an inner surface substantially parallel thereto; a pair of substantially U-shaped extensions having first free end portions respectively located in and filling said grooves and second free end portions extending about said projecting guides and each having an inner face directed toward said guiding face and spaced from the projecting guide about which said extension is located; a pair of elongated contact members respectively located between said inner faces of said extensions and said projecting guides and slidably engaging the latter; a pair of wedge members located between and engaging said inner face of each extension and each contact member respectively to provide a uniform sliding contact between said projecting guides and contact members so as to eliminate play between said support and carriage; a plurality of dowel pins mounted on said carriage and engaging said extensions to urge the latter against said inner surfaces of said grooves of said carriage, respectively; and a plurality of screw members fixing said extensions to said carriage, said screw members extending transversely to the length of said projecting guides.

14. In a machine tool, in combination, a support having a guiding face and a pair of projecting guides extending along opposite side edges of said guiding face and including said side edges; a carriage slidably engaging said guiding face of said support and being formed at opposite sides thereof with a pair of elongated grooves substantially parallel to projecting guides and each having, nearest to said guiding face, an inner surface substantially parallel thereto; a pair of substantially U-shaped extensions having first free end portions respectively located in and filling said grooves and second free end portions extending about said projecting guides and each having an inner face directed toward said guiding face and spaced from the projecting guide about which said extension is located; a pair of elongated contact members respectively located between said inner faces of said extensions and said projecting guides and slidably engaging the latter, each of said contact members being thickest at its central position and tapering toward its opposite ends at its face distant from said guiding face to provide each contact member with a pair of oppositely inclined face portions directed toward the inner face of the extension at which said contact member is located; a pair of wedge members located between and engaging said inner face of each extension and said oppositely inclined face portions, respectively, of each contact member, each wedge member being formed in its face contacting said extension with a groove extending transversely to the length of said wedge members; and two pairs of screw members threadedly engaging said extensions, respectively, being substantially parallel to said wedge members, and respectively having annular flange portions respectively located in said grooves of said wedge members so that said wedge members are longitudinally shifted upon turning of said screw members.

References Cited in the file of this patent

UNITED STATES PATENTS

| | | |
|---|---|---|
| 903,872 | Lagergren | Nov. 17, 1908 |
| 1,436,728 | Schellens | Nov. 28, 1922 |
| 1,466,930 | Cipra | Sept. 4, 1923 |
| 2,239,867 | Weckstein | Apr. 29, 1941 |
| 2,539,769 | Berthiez | Jan. 30, 1951 |
| 2,571,043 | Lange | Oct. 9, 1951 |